(12) United States Patent
Dolby et al.

(10) Patent No.: US 11,573,790 B2
(45) Date of Patent: Feb. 7, 2023

(54) GENERATION OF KNOWLEDGE GRAPHS BASED ON REPOSITORIES OF CODE

(71) Applicant: International Business Machines Corporation, Armonk, NY (US)

(72) Inventors: Julian Timothy Dolby, Bronx, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/704,098

(22) Filed: Dec. 5, 2019

(65) Prior Publication Data

US 2021/0173641 A1    Jun. 10, 2021

(51) Int. Cl.
*G06F 9/44* (2018.01)
*G06F 8/75* (2018.01)
*G06N 5/02* (2023.01)

(52) U.S. Cl.
CPC ........ *G06F 8/75* (2013.01); *G06N 5/02* (2013.01)

(58) Field of Classification Search
CPC .................................... G06F 8/75; G06N 5/02
USPC ............................... 717/104–116, 120–123
See application file for complete search history.

(56) References Cited

U.S. PATENT DOCUMENTS

| | | | |
|---|---|---|---|
| 6,263,339 B1 | 7/2001 | Hirsch | |
| 7,703,085 B2 | 4/2010 | Poznanovic et al. | |
| 7,984,422 B2* | 7/2011 | Graham | G06F 8/36 717/111 |
| 8,843,884 B1 | 9/2014 | Koerner | |
| 9,658,839 B2 | 5/2017 | Hale et al. | |
| 10,073,763 B1 | 9/2018 | Raman et al. | |
| 10,229,200 B2 | 3/2019 | Bornea et al. | |
| 10,303,448 B2* | 5/2019 | Steven | G06F 8/41 |
| 10,402,175 B2 | 9/2019 | McFarland | |
| 2006/0294499 A1* | 12/2006 | Shim | G06F 9/44 717/107 |
| 2011/0202559 A1 | 8/2011 | Stiers | |
| 2017/0109933 A1 | 4/2017 | Voorhees et al. | |
| 2019/0005163 A1 | 1/2019 | Farrell et al. | |
| 2020/0110746 A1* | 4/2020 | Lecue | G06F 17/11 |
| 2021/0173641 A1 | 6/2021 | Dolby et al. | |

FOREIGN PATENT DOCUMENTS

| | | |
|---|---|---|
| CN | 108334321 A | 7/2018 |
| CN | 110134848 A | 8/2019 |
| CN | 110362596 A | 10/2019 |
| CN | 111091883 A | 5/2020 |

(Continued)

OTHER PUBLICATIONS

Yu et al., "Deep Code Curator—Technical Reporton Code2Graph", Apr. 2019, CECS Technical Report, University of California, Irvine, 33 pages. (Year: 2019).*

(Continued)

*Primary Examiner* — Ted T. Vo
(74) *Attorney, Agent, or Firm* — Patterson + Sheridan, LLP

(57) ABSTRACT

Techniques for code analysis are provided. User code is received, and an import statement is identified in the user code. A first empty object is generated based on the import statement, and the first empty object is named based on the name of an import reference included in the import statement. A knowledge graph is generated based at least in part on the first empty object.

18 Claims, 5 Drawing Sheets

(56) References Cited

FOREIGN PATENT DOCUMENTS

| CN | 111353005 A | 6/2020 |
|---|---|---|
| CN | 112287679 A | 1/2021 |
| KR | 101505546 B1 | 3/2015 |
| KR | 101762670 B1 | 8/2017 |

OTHER PUBLICATIONS

M. Allamanis, E. T. Barr, P. Devanbu, and C. Sutton, "A survey of machine learning for big code and naturalness," ACM Comput. Surv., vol. 51, No. 4, pp. 81:1-81:37, Jul. 2018. [Online]. Available: http://doi.acm.org/10.1145/3212695 [Abstract Only].
Z. Li, D. Zou, S. Xu, H. Jin, Y. Zhu, Z. Chen, S. Wang, and J. Wang, "Sysevr: A framework for using deep learning to Tetect software vulnerabilities," CoRR, vol. abs/1807.06756, 2018, 13 pages.
J. Alon, M. Zilberstein, O. Levy, and E. Yahav, "A general pathbased representation for predicting program properties," CoRR, vol. abs/1803.09544, 2018, 16 pages.
Xing Hu, Yuhan Wei, Ge Li, Zhi Jin, "Codesum: Translate program language to natural language," CoRR, vol. abs/1708.01837, 2017, withdrawn. [Online]. Available: http://arxiv.org/abs/1708.01837 [Abstract Only].
Ml. White, M. Tufano, C. Vendome, and D. Poshyvanyk, "Deep learning code fragments for code clone detection," in Proceedings of the 31st IEEE/ACM International Conference on Automated Software Engineering, ser. ASE 2016. New York, NY, USA: ACM, 2016, pp. 87-98.
M. Allamanis, M. Brockschmidt, and M. Khademi, "Learning to represent programs with graphs," CoRR, vol. abs/1711.00740, 2017, 17 pages.
B. Bichsel, V. Raychev, P. Tsankov, and M. Vechev, "Statistical deobfuscation of android applications," in Proceedings of the 2016 ACM SIGSAC Conference on Computer and Communications Security,ser. CCS '16. New York, NY, USA: ACM, 2016, pp. 343-355.
J. Alon, O. Levy, and E. Yahav, "code2seq: Generating sequences from structured representations of code," CoRR, vol. abs/1808.01400, 2018, 22 pages.
O. Agesen, J. Palsberg, and M. I. Schwartzbach, "Type inference of self: Analysis of objects with dynamic and multiple inheritance," Softw., Pract. Exper, vol. 25, pp. 975-995, 1995.
C. Chambers and D. Ungar, "Iterative type analysis and extended message splitting; optimizing dynamically-typed abject-oriented programs," in ACM SIGPLAN Notices, vol. 25, No. 6. ACM, 1990, pp. 150-164.
O. Shivers, "Control-flow analysis of higher-order languages : or taming lambda,", May 1991, CMU-CS-91-145, 200 pages.
A. Feldthaus, M. Schäfer, M. Sridharan, J. Dolby, and F. Tip, "Efficient construction of approximate call graphs for javascript IDE services," in 35th International Conference on Software Engineering, ICSE '13, San Francisco, CA, USA, May 18-26, 2013, 2013, pp. 752-761.
C. Hsiao, M. J. Cafarella, and S. Narayanasamy, "Reducing mapreduce abstraction costs for text-centric applications," in 43rd International Conference on Parallel Processing, ICPP 2014, Minneapolis, MN, USA, Sep. 9-12, 2014, 2014, pp. 40-49.
M. Feurer, J. T. Springenberg, and F. Hutter, "Using meta-learning to initialize bayesian optimization of hyperparameters," in Proceedings of the 2014 International Conference on Meta-learning and Algorithm Selection—vol. 1201, ser. MLAS'14. Aachen, Germany, Germany: CEUR-WS.org, 2014, pp. 3-10.
P. Fernandes, M. Allamanis, and M. Brockschmidt, "Structured neural summarization," CoRR, vol. abs/1811.01824, 2018, 18 pages.
K. Chae, H. Oh, K. Heo, and H. Yang, "Automatically generating features for learning program analysis heuristics for c-like languages," Proc. ACM Program. Lang., vol. 1, No. OOPSLA, pp. 101:1-101:25,Oct. 2017, 25 pages.
M. Bruch, M. Monperrus, and M. Mezini, "Learning from examples to improve code completion systems," in Proceedings of the the 7th Joint Meeting of the European Software Engineering Conference and the ACM SIGSOFT Symposium on The Foundations of Software Engineering.ser. ESEC/FSE '09. New York, NY, USA: ACM, 2009, pp. 213-222. [Online], Available: http://doi.acm.org/10.1145/1595696.1595728.
S. Proksch, J. Lerch, and M. Mezini, "Intelligent code completion with bayesian networks," ACM Trans. Softw. Eng. Methodol., vol. 25, No. 1, pp. 3:1-3:31, Dec. 2015. [Online]. Available: http://doi.acm.org/10.1145/2744200 [Abstract Only].
A. T. Nguyen and T. N. Nguyen, "Graph-based statistical language model for code," in Proceedings of the 37th International Conference on Software Engineering—vol. 1, ser. ICSE '15. Piscataway, NJ, USA: IEEE Press, 2015, pp. 858-868.
T. T. Nguyen, H. A. Nguyen, N. H. Pham, J. M. Al-Kofahi, and T. N.Nguyen, "Graph-based mining of multiple object usage patterns," in Proceedings of the the 7th Joint Meeting of the European Software Engineering Conference and the ACM SIGSOFT Symposium on The Foundations of Software Engineering, ser. ESEC/FSE '09. New York, NY, USA: ACM, 2009, pp. 383-392. [Online], Available:http://doi.acm.org/10.1145/1595696.1595767 [Abstract Only].
R. S. Olson, N. Bartley, R. J. Urbanowicz, and J. H. Moore, "Evaluation of a tree-based pipeline optimization tool for automating data science," in Proceedings of the Genetic and Evolutionary Computation Conference 2016, ser. GECCO '16. New York, NY, USA: ACM, 2016, pp. 485-492.
Andreea Grigoriu et al., "SIENA: Semi-automatic semantic enhancement of datasets using concept recognition," Journal of Biomedical Semantics, Year: 2021, pp. 1-12.
Huynh et al. "DAGOBAH: Enhanced Scoring Algorithms for Scalable Annotations of Tabular Data." SemTab@ ISWC, Year: 2020, pp. 1-13.
Khurana et al., "Semantic Annotation for Tabular Data." Dated: Dec. 15, 2020, pp. 1-9.
Mell et al., "The NIST Definition of Cloud Computing: Computer Security," NIST National Institute of Standards and Technology, Date: Sep. 2011, pp. 1-7.
Suhara et al., "Annotating Columns with Pre-Trained Language Models," Dated Mar. 1, 2022, pp. 1-15.
"List of IBM Patents or Patent Applications Treated As Related," for U.S. Appl. No. 16/704,098, filed Dec. 5, 2019.
Cremaschi, et al., "MantisTable: an Automatic Approach for the Semantic Table Interpretation", Conference SemTab 2019: Semantic Web Challenge on Tabular Data to Knowledge Graph Matching co-located with the 18th International Semantic Web Conference, Oct. 2019, 10 pgs.
Cambronero, et al., "wranglesearch: Mining Data Wrangling Functions from Python Programs [Under submission]", Downloaded from the internet on May 21, 2022, 9 pgs.,<https://www.josecambronero.com/publication/wranglesearch/wranglesearch/>.
Yan, et al., "Synthesizing Type-Detection Logic for Rich Semantic Data Types using Open-source Code", SIGMOD'18, Jun. 10-15, 2018, 16 pgs.
"H2O AI Feature Store", Downloaded from the Internet on Oct. 26, 2022, 5 pgs., <https://h2o.ai/platform/ai-cloud/make/feature-store/>.
Namaki, et al., "Vamsa: Automated Provenance Tracking in Data Science Scripts," Research Track Paper, Aug. 23-27, 2020, Virtual Event, USA, 10 pgs.
Khurana, et al., "Feature Engineering for Predictive Modeling Using Reinforcement Learning", The Thirty-Second AAAI Conference on Artificial Intelligence (AAAI-18), Sep. 21, 2017, 8 pgs.
Galhotra, et al., "Semantic Search over Structured Data", CiKM '20: Proceedings of the 29th ACM International Conference on Information & Knowledge Management, Oct. 2020, 4 pgs., <https://doi.org/10.1145/3340531.3417426>.
Neumaier, et al., "Multi-level semantic labelling of numerical values", The Semantic Web—ISWC 2016. ISWC 2016. Lecture Notes in Computer Science, vol. 9981. Springer, Cham., 16 pgs. <https://doi.org/10.1007/978-3-319-46523-4_26>.
Ota, et al., "Data Driven Domain Discovery for Structured Datasets", Proceedings of the VLDB Endowment, vol. 13, No. 7, Sep. 2020, 13 pgs.

(56) References Cited

OTHER PUBLICATIONS

Srinivas, et al., "Semantic Feature Discovery with Code Mining and Semantic Type Detection", Jun. 28, 2022, 3 pgs.

Oliveira, et al., "ADOG-Annotating Data with Ontologies and Graphs", In SemTab@ ISWC, 2019, 6 pgs.

Nguyen, et al., "MTab: Matching Tabular Data to Knowledge Graph using Probability Models", arXiv:1910.00246v1 [cs.AI], Oct. 1, 2019, 8 pgs.

Morikawa, H., "Semantic Table interpretation using LOD4ALL", SemTab@ ISWC, 2019, 8 pgs.

Jimenez-Ruiz, et al.,"SemTab2019: Resources to Benchmark Tabular Data to Knowledge Graph Matching Systems;"European Semantic Web Conference, Springer 2020, 41 pgs.

Galhotra, et al., "Automated Feature Enhancement for Predictive Modeling using External Knowledge",2019 International Conference on Data Mining Workshops (ICDMW), Nov. 8-11, 2019, 4 pgs., doi: 10.1109/ ICDMW.2019.00161.

Ritze, et al., "Matching HTML tables to DBpedia", Proceedings of the 5th International Conference on Web Intelligence, Mining and Semantics, Article 10, Jul. 2015, 6 pgs.

Limaye, et al., "Annotating and searching web tables using entities, types and relationships", 36th International Conference on Very Large Data Bases, Sep. 13-17, 2010, Proceedings of the VLDB Endowment, vol. 3, No. 1, Singapore 10 pgs.

Zhang, et al., "Sato: Contextual Semantic ype Detection in Tables", Proceedings of the VLDB Endowment, vol. 13, No. 11, 2020, DOI: https://doi.org/10.14778/3407790.3407793, 14 pgs.

Hulsebos, et al., "Sherlock: A Deep Learning Approach to Semantic Data Type Detection", KDD '19, Aug. 4-8, 2019, Anchorage, AK, USA, 9 pgs.

Chen, et al., "Learning Semantic Annotations forTabular Data", Proceedings of the Twenty-Eighth International Joint Conference on Artificial Intelligence (IJCAI-19) May 30, 2019, 7 pgs.

Chen, et al., "Colnet: Embedding the Semantics of Web Tables for Column Type Prediction", The Thirty-Third AAAI Conference on Artificial Intelligence (AAAI-19), Nov. 4, 2018, 8 pages.

\* cited by examiner

GENERATION OF KNOWLEDGE GRAPHS BASED ON REPOSITORIES OF CODE

BACKGROUND

The present disclosure relates to code abstraction from underlying computer code, and more specifically, to building a knowledge graph using a lightweight, generic code abstraction of computer code from multiple software applications.

Traditional software program analysis involves parsing syntax of computer code into tokens, and using the tokens to build an abstraction of the code. The code abstraction is used to analyze a software program.

An abstract syntax tree (AST) is a common code abstraction used to analyze software applications. Building an AST involves the parsing of code from a software application to create a tree depicting the structure of the code. ASTs treat programming constructs, such as flow control statements and expressions, as nodes of the tree, while operators and operands are treated as the leaves of the tree.

ASTs may be used to perform code analysis techniques such as control flow analysis and data flow analysis. One issue with using ASTs for code analysis is the lack of precision in tracking the control flow and data flow of the code. For example, in programming languages supporting higher order functions, such a function nesting a lower order function, may not semantically reveal the call of a lower order function, particularly when the lower order function is referenced in a loosely typed language. Hence, in this instance, a data flow analysis could not precisely track the data flow of the lower order function, and thereby fail to reveal complete relationships between calls in the code.

Another issue with using ASTs for code analysis is the lack of scalability. Code analysis is complicated by the use of a wide selection of rich application programming interfaces (APIs) used in modern programs. Data manipulation in modern programs often interweaves API calls from multiple sources. Control flow analysis and data flow analysis of these API calls involve an analysis of the underlying code, which may be voluminous and complicated.

Alternatively, code analysis may involve modeling APIs with long, formal descriptions capturing the semantics of the underlying code. In either case, a computer system may lack the resources to analyze the underlying code, particularly when the code analysis is scaled across a large number of programs, due to the size and complexity of the code.

SUMMARY

According to one embodiment of the present disclosure, a method is provided. The method comprises receiving user code; identifying an import statement in the user code; generating a first empty object based on the import statement; naming the first empty object based on the name of an import reference included in the import statement; and generating a knowledge graph based at least in part on the first empty object. Advantageously, this enables efficient analysis of which types and groups of APIs are used, and how often they are used, in the user code based on a relatively low-resource analysis of the names of the empty objects, as compared to the relatively resource-intensive analysis of the user code. Further, the knowledge graph enables readily-accessible code analysis of the user code and imported APIs.

According to another embodiment of the present disclosure, the method further comprises identifying a first control call in the user code; determining an invocation of the first control call on the first empty object; generating a second empty object based on the invocation of the first control call; and naming the second empty object based on a name of the first empty object and a name of the first control call. Further, according to another embodiment, the first control call can be a function call or a method call. Advantageously, this enables efficient determination of the data flow of the user code. This also enables the knowledge graph to better recognize patterns in how APIs are used at the function or method level without having to analyze or understand the semantics of how the APIs are implemented in the underlying code, or even which operations the functions or methods perform.

According to another embodiment of the present disclosure, the first empty object and the second empty object do not include any code statement. Advantageously, this enables efficient analysis of imported modules and control calls in the user code based on a relatively low-resource analysis of the names of the empty objects, as compared to the relatively resource-intensive analysis of code contained in the control calls. This further enables scaling the code analysis across multiple, large bodies of code.

According to another embodiment of the present disclosure, the method further comprises identifying an argument passed as a parameter in a second control call; resolving the argument to an existing empty object; determining an invocation of a third control call on the existing empty object; generating a third empty object based on the invocation of the third control call; and naming the third empty object based on a name of the existing empty object and a name of the third control call. Further, according to another embodiment, the third control call can be a function call or a method call, and the existing and third empty objects do not include any code statement. Advantageously, this enables capturing, for code analysis, the control calls operating on arguments passed as parameters, which increases the accuracy of the code analysis. In addition, this enables efficient analysis of imported modules and control calls in the user code based on a relatively low-resource analysis of the names of the empty objects, as compared to the relatively resource-intensive analysis of code contained in the control calls. This further enables scaling the code analysis across multiple, large bodies of code.

According to another embodiment of the present disclosure, the knowledge graph includes code data from at least one of: (i) a code comment embedded in the user code, (ii) a code comment embedded in a first code module referenced by the import statement, (iii) a code usage document external to the user code, (iv) an internet forum, (iv) a class hierarchy depicted in a second code module. Advantageously, this enables further growth of the knowledge graph, as more sources of code information can be used add more nodes to the knowledge graph, and to strengthen or vet relationships between nodes in the knowledge graph. This further enables the knowledge graph to improve code correction, prediction, suggestion, and the like.

According to one embodiment of the present disclosure, a computer-readable medium containing computer program code that performs an operation when executed on one or more computer processors, is provided. The operation is configured to receive user code; identify an import statement in the user code; generate a first empty object based on the import statement; name the first empty object based on the name of an import reference included in the import statement; and generate a knowledge graph based at least in part on the first empty object. Advantageously, this enables efficient analysis of which types and groups of APIs are used, and how often they are used, in the user code based on a relatively low-resource analysis of the names of the empty objects, as compared to the relatively resource-intensive analysis of the user code. Further, the knowledge graph enables readily-accessible code analysis of the user code and imported APIs.

According to another embodiment of the present disclosure, the operation is further configured to identify a first control call in the user code; determine an invocation of the first control call on the first empty object; generate a second empty object based on the invocation of the first control call; and name the second empty object based on a name of the first empty object and a name of the first control call. Further, according to another embodiment, the first control call can be a function call or a method call. Advantageously, this enables efficient determination of the data flow of the user code. This also enables the knowledge graph to better recognize patterns in how APIs are used at the function or method level without having to analyze or understand the semantics of how the APIs are implemented in the underlying code, or even which operations the functions or methods perform.

According to another embodiment of the present disclosure, the first empty object and the second empty object do not include any code statement. Advantageously, this enables efficient analysis of imported modules and control calls in the user code based on a relatively low-resource analysis of the names of the empty objects, as compared to the relatively resource-intensive analysis of code contained in the control calls. This further enables scaling the code analysis across multiple, large bodies of code.

According to another embodiment of the present disclosure, the operation further configured to identify an argument passed as a parameter in a second control call; resolve the argument to an existing empty object; determine an invocation of a third control call on the existing empty object; generate a third empty object based on the invocation of the third control call; and name the third empty object based on a name of the existing empty object and a name of the third control call. Further, according to another embodiment, the third control call can be a function call or a method call, and the existing and third empty objects do not include any code statement. Advantageously, this enables capturing, for code analysis, the control calls operating on arguments passed as parameters, which increases the accuracy of the code analysis. In addition, this enables efficient analysis of imported modules and control calls in the user code based on a relatively low-resource analysis of the names of the empty objects, as compared to the relatively resource-intensive analysis of code contained in the control calls. This further enables scaling the code analysis across multiple, large bodies of code.

According to another embodiment of the present disclosure, the knowledge graph includes code data from at least one of: (i) a code comment embedded in the user code, (ii) a code comment embedded in a first code module referenced by the import statement, (iii) a code usage document external to the user code, (iv) an internet forum, (iv) a class hierarchy depicted in a second code module. Advantageously, this enables further growth of the knowledge graph, as more sources of code information can be used add more nodes to the knowledge graph, and to strengthen or vet relationships between nodes in the knowledge graph. This further enables the knowledge graph to improve code correction, prediction, suggestion, and the like.

According to one embodiment of the present disclosure, a method for generating a knowledge graph is provided. The method comprises receiving empty objects; generating a node for each empty object; determining control flow and data flow for the empty objects; generating control flow edges indicating the control flow for the empty objects; and generating data flow edges indicating the data flow for the empty objects. Advantageously, this enables aggregation and access to analysis of the control flow and data flow of the user code in a readily-accessible manner. This also enables better recognition of coding patterns and practices gleaned from the user code, such as how APIs are used at the function or method level.

According to one embodiment of the present disclosure, each node includes a name based on a name of each respective received empty object. Advantageously, this enables efficient analysis of imported modules and control calls in the user code based on a relatively low-resource analysis of the names of the empty objects.

According to one embodiment of the present disclosure, the control flow indicates an execution order of user code represented by the empty objects, and the data flow indicates call relationships between functions, methods, or APIs represented by the empty objects. Further, according to another embodiment, the data flow edges indicate the data flow between control calls in the user code represented by the empty objects. Advantageously, this enables better pattern recognition for code bases with similar control flows, which further enables improved code suggestion. In addition, this enables the knowledge graph to better recognize relationships and patterns in how APIs are used at the function or method level. This further enables improved code suggestion, code refactoring, and the like.

According to another embodiment of the present disclosure, the knowledge graph includes code data from at least one of: (i) a code comment embedded in the user code, (ii) a code comment embedded in a first code module referenced by the import statement, (iii) a code usage document external to the user code, (iv) an internet forum, (iv) a class hierarchy depicted in a second code module. Advantageously, this enables further growth of the knowledge graph, as more sources of code information can be used add more nodes to the knowledge graph, and to strengthen or vet relationships between nodes in the knowledge graph. This further enables the knowledge graph to improve code correction, prediction, suggestion, and the like.

According to one embodiment of the present disclosure, the data flow edges are weighted based on a frequency of control calls in the user code represented by the empty objects. Advantageously, this enables better pattern recognition with respect to which control calls precede or follow another control call, and how likely a particular control call or sequence of calls is to be implemented in user code. This further enables accurate code prediction, improved code suggestion, improved code refactoring, and the like.

According to a different embodiment of the present disclosure, any combination of the above-discussed embodiments can be implemented by one or more computer-readable storage media. The computer-readable storage media collectively contain computer program code that, when executed by operation of one or more computer processors, performs an operation. In embodiments, the operation performed can correspond to any combination of the above methods and embodiments.

According to still another embodiment of the present disclosure, any combination of the above-discussed embodiments can be implemented by a system. The system includes one or more computer processors, and one or more memories collectively containing a program which, when executed by the one or more computer processors, performs an operation. In embodiments, the operation performed can correspond to any combination of the above methods and embodiments.

BRIEF DESCRIPTION OF THE SEVERAL
VIEWS OF THE DRAWINGS

DETAILED DESCRIPTION

Embodiments of the present disclosure implement a scalable, general-purpose code abstraction that enables creation and evaluation of a knowledge graph for multiple use cases. In some embodiments, a scalable code abstraction (SCA) is created based on relationships among API calls in the underlying source code of one or more programs. By focusing on the API call relationships, embodiments of the present disclosure allow for a semantic understanding of frameworks and APIs used in the code, without needing to analyze the underlying code from the frameworks or APIs themselves.

In some embodiments, the SCA is used to create a knowledge graph that aggregates this semantic understanding in a readily-accessible manner. The knowledge graph may be used to recognize patterns in how APIs are used at the function or method level without having to analyze or understand the semantics of how the APIs are implemented in the underlying code, or even which operations the functions or methods perform. Forgoing resource intensive code analysis greatly increases the number and size of code bases that can be analyzed. Further, a more expansive base of analyzed code can result in greater pattern recognition, thereby improving code suggestions and substitutions. Moreover, by focusing on patterns of use, rather than analysis of the functionality the underlying code provides, embodiments of the present disclosure enable deeper and more widely-applicable understandings to be gleaned. Likewise, this pattern recognition may be used to identify bad coding patterns, which may be brought to the attention of the user.

As used herein, control flow refers to the logical steps the program takes from its beginning to its termination. Further, in the present disclosure, data flow refers to possible values of a tracked property throughout the execution of the program, which is captured by the control flow.

Figure 1:
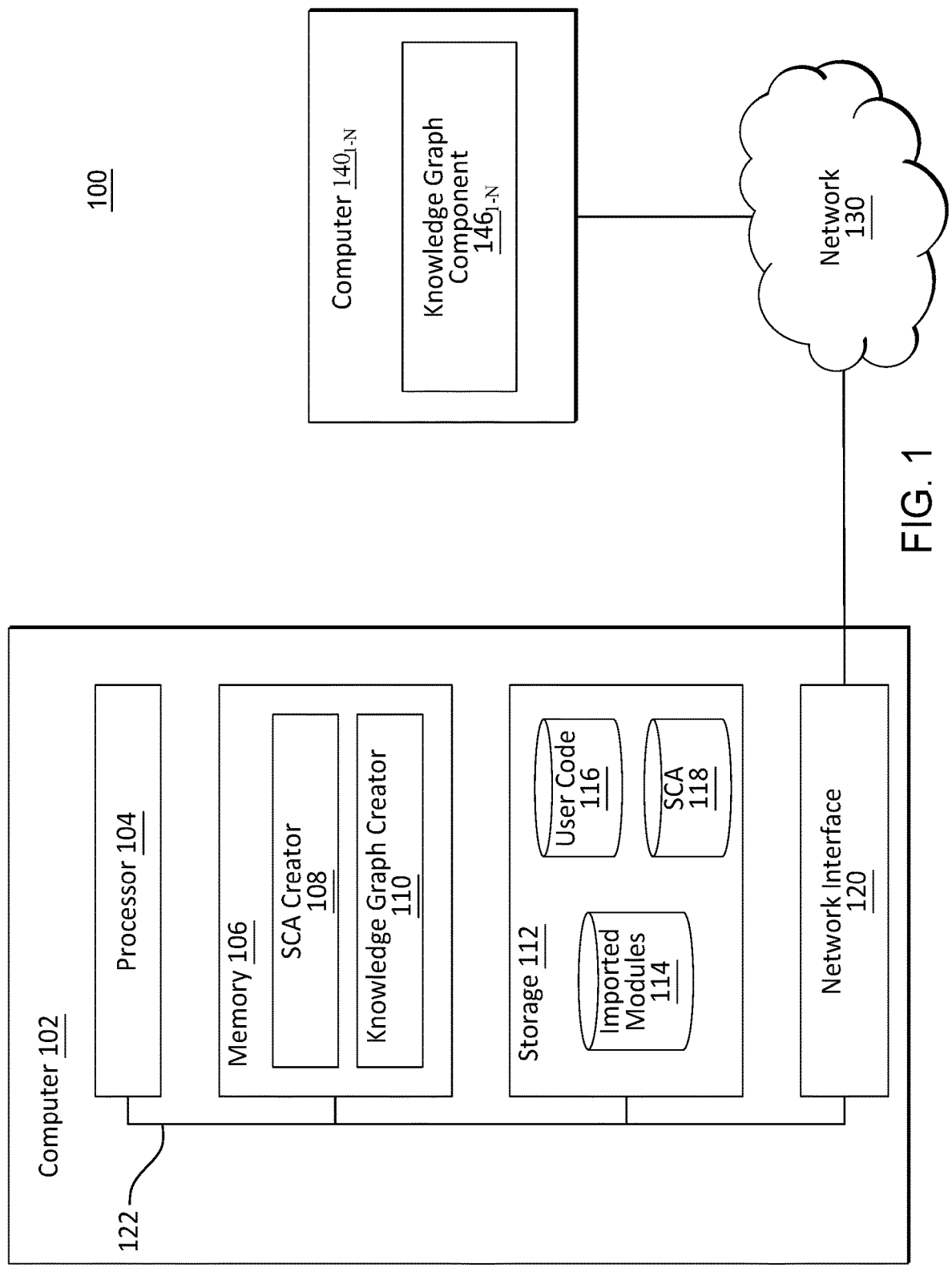
FIG. 1 illustrates a computing environment including a scalable code abstraction creator and knowledge graph creator capable of generating a knowledge graph, according to one embodiment.

FIG. 1 illustrates a computing environment 100 including an SCA creator and knowledge graph creator used to generate a knowledge graph, according to one embodiment. In an embodiment, the computing environment 100 can include one or more virtual devices and/or physical devices, which can be arranged in a cloud environment, in a distributed network, or the like. In another embodiment, the computing environment includes a single computer.

In yet another embodiment, the computing environment includes a computer 102 that is communicatively coupled to one or more other computers $140_{1-N}$ via a network 130. Although not included in the illustrated embodiment, each of the computers $140_{1-N}$ may generally include processors, memory, storage, network interfaces, input/output (I/O) devices, and the like. The network 130 may include, for example, a telecommunications network, a local or wide area network, the Internet, and the like.

In the illustrated embodiment, the computer 102 includes a processor 104, memory 106, storage 112, a network interface, and one or more I/O devices (not shown), communicatively coupled by one or more buses 122. The computer 102 is generally controlled by an operating system (not shown).

The processor 104 is a programmable logic device that can perform instruction, logic, and mathematical processing. The processor 104 may retrieve and execute programming instructions stored in memory 106, or store and retrieve application data residing in storage 112. The processor 104 is generally representative of a single CPU or GPU, multiple CPUs or GPUs, a single CPU or GPU having multiple processing cores, and the like.

The memory 106 may be representative of a random access memory. The storage 112 may be representative of hard-disk drives, solid state drives, flash memory devices, optical media and the like. The storage 112 can include fixed or removable storage devices, such as fixed disk drives, removable memory cards, caches, optical storage, network attached storage (NAS), or storage area networks (SAN). The memory 106 and the storage 112 can also include memory or storage physically located away from the computer 102. For example, the memory 106 or storage 112 may be located on another computer coupled to computer 102 via the bus 122, or the network 130.

The network interface 120 can include any type of network communications interface allowing the computer 102 to communicate with other computers via the network 130. Although not included in the illustrated embodiment, the system can further include one or more input devices, which can include any device for providing input to the computer 102. For example, the input device may include keyboards, mice, controllers, buttons, switches, or other physical device mechanisms for controlling the computer 102. Output devices (not shown) may include output devices such as monitors, touch screen displays, and the like.

In the illustrated embodiment, the memory 106 includes an SCA (scalable code abstraction) creator 108, and a knowledge graph creator 110. Additionally, the storage 112 includes imported modules 114, user code 116, and an SCA 118.

In some embodiments, the imported modules 114 are made available for use via one or more import statements in the user code 116. Generally, the SCA creator 108 analyzes the user code 116, identifies calls internal to the user code 116 and calls made to the imported modules 114, and generates empty objects corresponding to each of the calls. In some embodiments, the calls can include API calls, function calls, method calls, and the like.

In some embodiments, the SCA creator 108 further generates an SCA 118 that operates as a container for the created empty objects. As discussed above, in at least one embodiment, each empty object corresponds to a call path from the user code 116. In some embodiments, the name of a given empty object includes a reference or indication of the corresponding call path. The call path may reference an API call path, a function call path, a method call path, or the like.

In one embodiment, the knowledge graph creator 110 uses the SCA 118 to generate a knowledge graph depicting the control flow and data flow of the user code 116. The knowledge graph may be included in the storage 112 or in the one or more computers $140_{1-N}$, in whole or in a plurality of knowledge graph components $146_{1-N}$.

Figure 2:
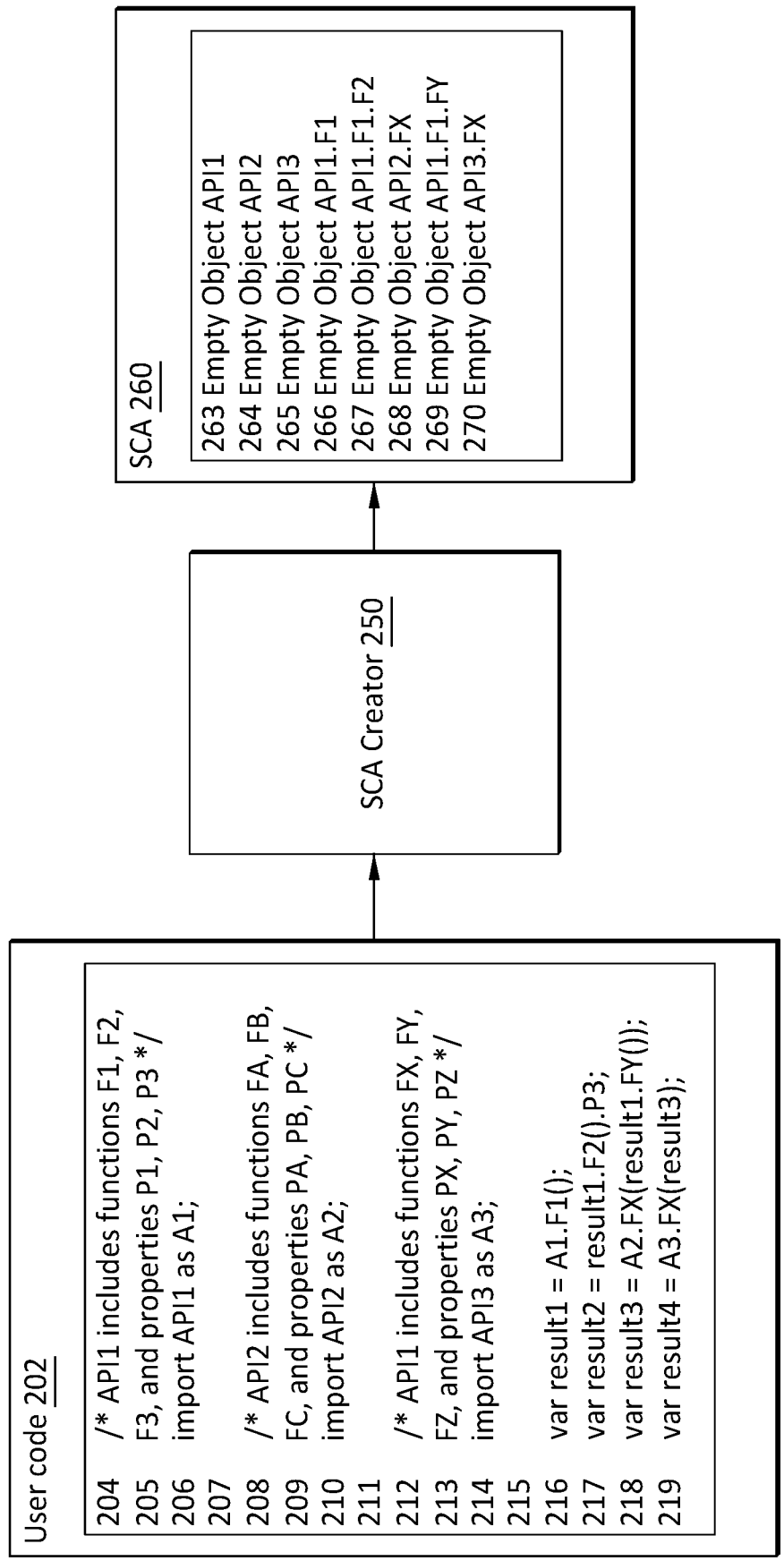
FIG. 2 illustrates a workflow of a scalable code abstraction creator generating empty objects from code, according to one embodiment.

FIG. 2 illustrates an SCA creator generating empty objects from code, according to one embodiment. In the illustrated embodiment, an SCA creator 250 receives user code 202. The user code 202 includes import statements for API1 (A1) at line 206, API2 (A2) at line 210, and API3 (A3) at line 214 to aid in data manipulation. A1 includes functions F1, F2, and F3. A1 also includes properties P1, P2, and P3. Further, as illustrated, A2 includes functions FA, FB, and FC. A2 also includes properties PA, PB, and PC. A3 includes functions FX, FY, and FZ. A3 also includes properties PX, PY, and PZ.

The user code 202 can include any number of assignments, operations, or statements to manipulate data. For example, in the illustrated embodiment, the user code 202 includes statements at lines 216-219 performing various operations and transformations. Statement 216 invokes function F1 on A1, and assigns the result to result1. Similarly, statement 217 invokes function F2 on results1, accesses property P3, and assigns the result to result2. Statement 218 invokes function FY on result1, and passes the result as an argument to function FX. This function FX is invoked on A2, and the result is assigned to result3. Statement 219 passes result3 as an argument to function FX, and invokes FX on A3. The result is assigned to result4.

The SCA creator 250 parses the user code 202, or a representation of the user code 202 (herein referenced interchangeably as "user code"), to identify import statements and/or control calls in the user code 202. In some embodiments, a control call is an API call, a function call, a method call, and the like, which can indicate the control flow or data flow of the user code 202. A control call can be in the form of a statement, such as an assignment, an operation, and the like. A single statement may include multiple control calls. For example, the assignment statement at line 218 includes one control call when function FY is invoked on result 1, and another control call when function FX is invoked on A2.

The SCA creator 250 generates empty objects based on the import statements and control calls. In some embodiments, the SCA creator 250 also generates an SCA 260 that operates as a container for the generated empty objects. In the illustrated embodiment, the SCA creator 250 generates a new empty object for every API import statement in the user code 202. The SCA creator 250 also generates a new empty object every time a control call is invoked on an existing empty object. However, in at least one embodiment, property accesses and field accesses do not generate new empty objects. Further, in some embodiments, calls to primitives to not generate new empty objects.

For example, import statements 206, 210, and 214 generate new empty objects API1 (labeled 263), API2 (labeled 264), and API3 (labeled 265), respectively. As discussed above, the statement at line 216 invokes function F1 on A1, and assigns the result to result1. As A1 resolves to the previously-created empty object API1 (labeled 263), and function F1 operates on A1, the SCA creator 250 generates new empty object API1.F1 (labeled 266). API1.F1 (labeled 266) also indicates the data flow path for the statement at line 216, as it captures the data flow relationship between API1 and F1.

In some embodiments, the empty objects are empty objects (containing no code statements) that indicate data flow paths corresponding to the user code 202. For example, the name of an empty object may include a data flow path. Generally, data flow paths indicate the connectivity or relationships between statements corresponding to the control calls. Multiple, different empty objects can share the same name corresponding to different instances of the same data flow path. For example, statements "var x1=A1.F1" and "var x2=A1.F1" would generate two different empty objects named "API1.F1." Hence, the number of empty objects with the same name can indicate how commonly a control call is used.

The statement at line 217 invokes function F2 on result1, accesses property P3, and assigns the result to result2. As demonstrated above, result1 resolves to empty object API1.F1 (labeled 266). Since function F2 operates on result1, the SCA creator 250 generates new empty object API1.FLF2 (labeled 267). Accessing property P3 does not affect the creation of empty object API1.F1.F2 (labeled 267), since property accesses do not generate new empty objects. API1.F1.F2 (labeled 267) also indicates the data flow path for the statement at line 217, as it captures the data flow relationship between API1, F1, F2.

The statement at line 218 invokes function FY on result1, and passes the result as an argument to function FX. This function FX is invoked on A2, and the result is assigned to result3. Since A2 resolves to empty object API2 (labeled 264), and function FX operates in A2, the SCA creator 250 generates new empty object API2.FX (labeled 268). API2.FX (labeled 268) also indicates one data flow path for the statement at line 218, as it captures a data flow relationship between API2 and FX. As mentioned above, result1 resolves to empty object API1.F1 (labeled 266). Since function FY operates on result1, the SCA creator 250 generates a new empty object API1.F1.FY (labeled 269). API1.F1.FY (labeled 269) also indicates one data flow path for the statement at line 218, as it captures a data flow relationship between API1, F1, and FY.

The statement at line 219 passes result3 as an argument to function FX, and invokes FX on A3. The result is assigned to result4. Since A3 resolves to empty object API3 (labeled 265), and FX operates on A3, the SCA creator 250 generates new empty object API3.FX (labeled 270). API3.FX (labeled 270) also indicates a data flow path for the statement at line 219, as it captures the data flow relationship between API3 and FX. Because result3 is merely passed in as an argument, without including a control call to operate on result3, result3 is does not generate a new empty object.

Figure 3:
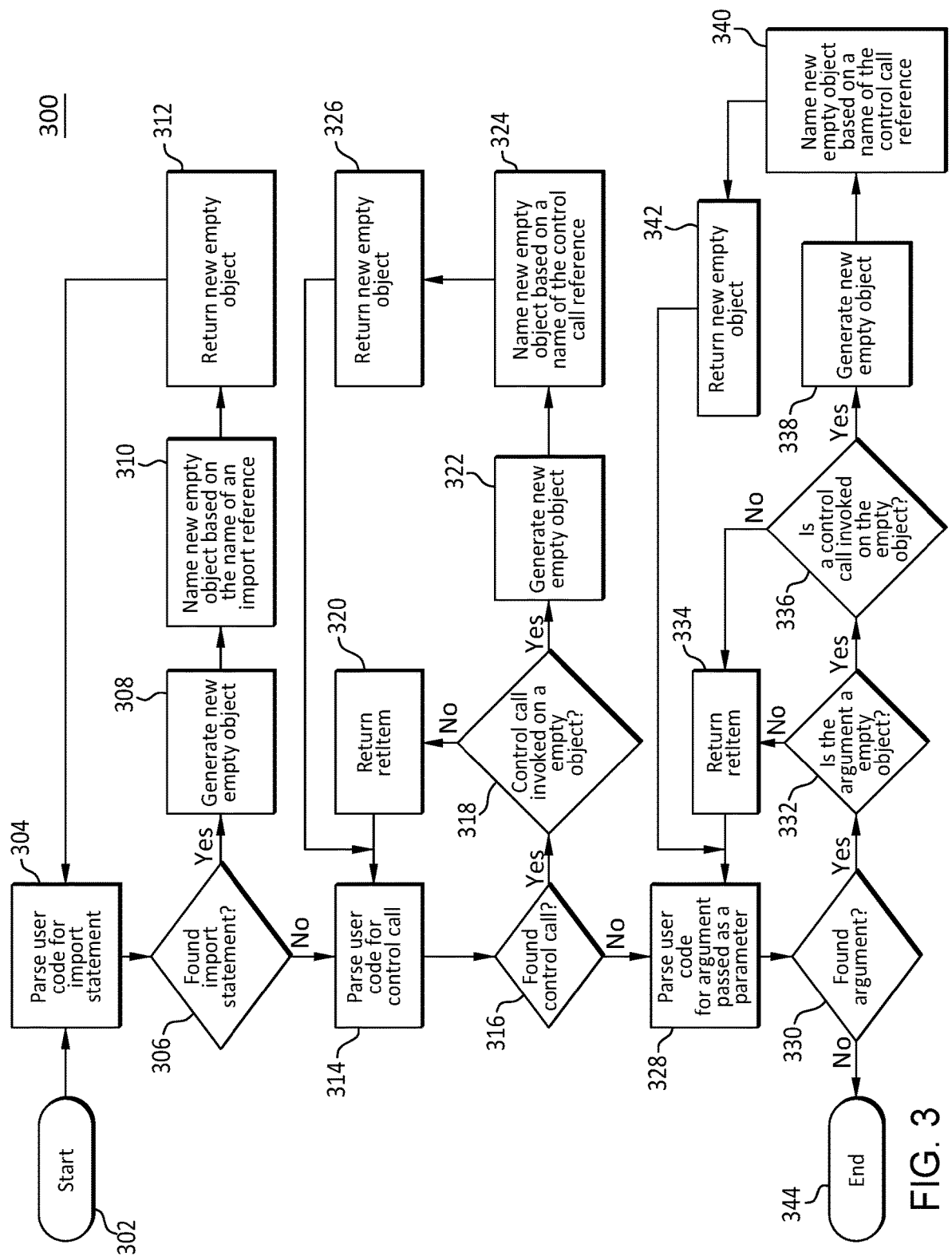
FIG. 3 illustrates a flowchart for a method of creating empty objects, according to one embodiment.

FIG. 3 illustrates a flowchart for creating empty objects, according to one embodiment. The method 300 begins at block 302 where an SCA creator receives user code (not shown). As previously mentioned, the user code can include any number of assignments, operations, or statements to manipulate data. At block 304, the SCA creator parses the user code for an import statement. At block 306, if an import statement is found in the user code, the SCA creator proceeds to block 308.

At block 308, the SCA creator generates a new empty object. For example, the SCA creator generates a new empty object if it finds an import statement such as "import APIX as Ax." At block 310, the new empty object is assigned a name based on the import statement found in the user code. In at least one embodiment, the new empty object is named or otherwise labeled based on the entity being imported. For example, for the SCA creator may name the new empty object "APIX." At block 312, the SCA creator returns or outputs the new empty object to an external destination, such as another software module, a memory location, or storage.

The method 300 then returns to block 304, the SCA creator continues to parse the user code for import statements. At block 306, if such an import statement is found in the user code, the SCA creator again proceeds to block 308. If no such import statement is found, the SCA creator proceeds to block 314. In this way, blocks 308, 310, and 312 are repeated for each import statement identified in block 306.

At block 314, the SCA creator parses the user code for a control call. As previously mentioned, a control call can be an API call, a function call, a method call, and the like, which can indicate the control flow or data flow of the user code. A control call can be in the form of a statement, such as an assignment, an operation, and the like. A single statement may include multiple control calls. At block 316, if a control call is located, the SCA creator proceeds to block 318.

At block 318, the SCA creator evaluates whether the control call is invoked on an empty object that was previously created. If the control call is not invoked on an empty object, the SCA creator proceeds to block 320. At block 320, the SCA creator returns or outputs a return item (referred herein as retItem) to an external destination. A retItem can be any data type, object, primitive, or value that is not a newly-created empty object. For instance, in at least one embodiment, a retItem can be a previously-created empty object.

Returning to block 318, if the control call is invoked on an existing empty object, the SCA creator proceeds to block 322. At block 322, the SCA creator generates a new empty object. For example, the SCA creator generates a new empty object if it finds a control call such as "APIX.FX." This control call indicates that function FX is being invoked on empty object APIX.

At block 324, the SCA creator assigns a name to the new empty object based on the control call found in the user code. For example, the SCA creator may name the new empty object "APIX.FX." At block 326, the SCA creator returns or outputs the new empty object to an external destination, such as another software module, a memory location, or storage.

Returning to block 314, the SCA creator continues to parse the user code for another control call. At block 316, if such a control call is found in the user code, the SCA creator again proceeds to block 318. If no additional control calls are found, the SCA creator proceeds to block 328. At block 328, the SCA creator parses the user code for an argument passed as a parameter to a control call.

At block 330, if an argument is found, the SCA creator proceeds to block 332. At block 332, if the argument does not correspond to an existing empty object, the SCA creator proceeds to block 334. As previously mentioned, the SCA creator can generate a new empty object when a control call is invoked on an existing empty object. Hence, if the argument found at block 330 is not an empty object, then the SCA creator would not generate a new empty object, even if a control call is invoked on the argument. At block 334, the SCA creator returns or outputs a retItem to an external destination. As mentioned above, a retItem can be any data type, object, primitive, or value that is not a new empty object.

Returning to block 332, if the argument is an empty object, the SCA creator proceeds to block 336. At block 336, if a control call is not invoked on the empty object, the SCA creator proceeds to block 334. At block 334, as mentioned above, the SCA creator returns or outputs a retItem to an external destination. Returning to block 336, if the control call is invoked on the empty object, the SCA creator proceeds to block 338.

At block 338, the SCA creator generates a new empty object. For example, the SCA creator generates a new empty object for an argument such as "APIX.FX." This argument indicates that the argument comprises function FX being invoked on empty object APIX. At block 340, the SCA generator assigns a name to the new empty object based on the name of the argument. For example, the SCA creator may name the new empty object "APIX.FX." At block 342, the SCA creator returns or outputs the new empty object to an external destination, such as another software module, a memory location, or storage.

Returning to block 328, the SCA creator again parses the user code for another argument passed as a parameter to a control call. At block 330, if such an argument is found, the SCA creator again proceeds to block 332. If no such control call is found, the SCA creator ends the empty object creator process at block 344.

Figure 4:
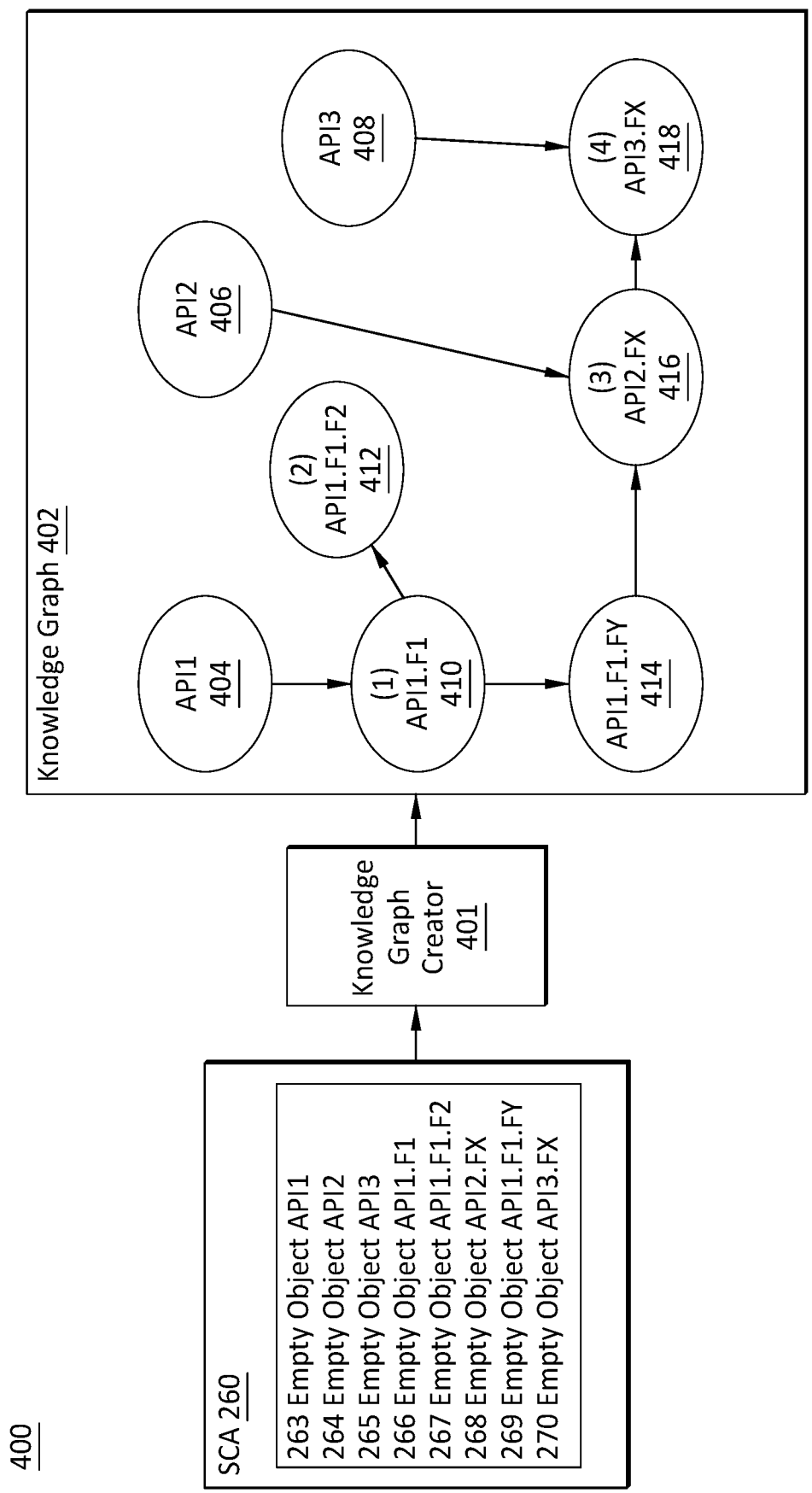
FIG. 4 illustrates a workflow of a knowledge graph creator generating a knowledge graph, according to one embodiment.

FIG. 4 illustrates a knowledge graph creator generating a knowledge graph, according to one embodiment. In the illustrated embodiment, the knowledge graph creator 401 receives user code, or a representation of user code (herein referenced interchangeably as "user code"), and/or empty objects. The empty objects can be received from an SCA 260. The knowledge graph creator 401 generates a node in a knowledge graph 402 for each received empty object. Each node can have the same name as the empty object on which it is based.

In some embodiments, the knowledge graph creator 401 determines the control flow of the user code by examining call sites for the control calls in the user code. The knowledge graph creator 401 can generate control flow edges between nodes based on the control flow analyzed from the user code. In the illustrated embodiment, the control flow edges (not shown, but parenthetically numbered) indicate the order of execution for function calls and method invocations in the user code.

In some embodiments, the knowledge graph creator 401 determines the data flow from the names of the empty objects, which indicate the data flow through the control calls of the user code. The knowledge graph creator 401 can generate data flow edges between nodes based on the data flow of the user code.

In the illustrated embodiment, the data flow edges (illustrated as arrows in the knowledge graph 402) show the data flow relationships between the nodes of the empty objects, thereby depicting the data flow relationships between the control calls in the user code. In at least one embodiment, the data flow edges are weighted based on the number of occurrences of control calls in the user code. That is, the knowledge graph creator 402 increases the weight of an edge between two nodes as the number of edges in common between the two nodes increases.

For example, for statements "var x1=AX.FZ" and "var x2=AX.FZ," the knowledge graph creator would generate one edge between nodes APIX and APIX.FZ corresponding to "var x1," and another edge between nodes APIX and APIX.FZ corresponding to "var x2." In some embodiments, these nodes and edges are further abstracted into a unified representation whereby the two instances of APIX are combined into one APIX node, and the two edges between the APIX and APIX.FZ nodes are combined into one weighted edge. Because this weighted edge represents two common edges, the weighted edge indicates a stronger relationship between APIX and APIX.FZ than an unweighted edge between these nodes.

The node for empty object API1.F1 (labeled 410) receives data from empty object API1 to invoke function F1. In turn, the knowledge graph creator 402 generates a data flow edge between the nodes for APB (labeled 404) and API1.F1 (labeled 410), wherein the data flow edge represents the data flow between these nodes. This edge may indicate a directed or undirected data flow relationship.

The node for empty object API1.F1.F2 (labeled 412) receives data from empty object API1.F1 to further invoke function F2. In turn, the knowledge graph creator 402 generates a data flow edge between the nodes for API1.F1 (labeled 410) and API1.F1.F2 (labeled 412), wherein the data flow edge represents the data flow between these nodes. This edge may indicate a directed or undirected data flow relationship.

The node for empty object API1.F1.FY (labeled 414) receives data from empty object API1.F1 to further invoke function FY. In turn, the knowledge graph creator 402 generates a data flow edge between the nodes for API1.F1 (labeled 410) and API1.F1.FY (labeled 414), wherein the data flow edge represents the data flow between these nodes. This edge may indicate a directed or undirected data flow relationship.

The node for empty object AP2.FX (labeled 416) receives data from API1.F1.FY as an argument, and receives data from API2 to further invoke function FX. In turn, the knowledge graph creator 402 generates a data flow edge between the nodes for API1.F1.FY (labeled 414) and API2.FX (labeled 416), and the nodes for API2 (labeled 406) and API2.FX (labeled 416). The data flow edges represent the data flow between these nodes. These edges may indicate directed or undirected data flow relationships.

The node for empty object API3.FX (labeled 418) receives data from API2.FX as an argument, and receives data from API3 to further invoke function FX. In turn, the knowledge graph creator 402 generates a data flow edge between the nodes for API2.FX (labeled 416) and API3.FX (labeled 418), and the nodes for API3 (labeled 408) and API3.FX (labeled 418). The data flow edges represent the data flow between these nodes. These edges may indicate directed or undirected data flow relationships.

Implementing the knowledge graph 402 to analyze code offers additional benefits as compared to implementing traditional program analysis. For example, because new empty objects are generated from control calls on existing empty objects, all such calls are captured. Hence, empty objects precisely capture the control flow and data flow of the code, enabling additional functionality such as code suggestion and code refactoring. That is, by accurately capturing the control flow and data flow of the user code, the knowledge graph can be implemented to recognize patterns in the control flow and data flow, and offer suggestions for what control calls the user should make next.

As previously mentioned, multiple empty objects with the same name can indicate how commonly a control call is used. Hence, multiple nodes with the same name can also indicate how commonly a control call is used. These multiple nodes can be used to aid in code suggestion by providing a large sample size of commonly used control calls from which to draw inferences on which control calls are commonly used after other control calls. Further, weighted edges between nodes can support inferences of how commonly a particular control call is invoked after another control call in the user code.

For example, if there is a first weighted edge indicating 100 edges between nodes APIX and APIX.FX1, as compared to a second weighted edge indicating 10 edges between nodes APIX and APIX.FX2, then as a programmer types "APIX" into an integrated development environment (IDE), the IDE may suggest to the programmer that the programmer should use function FX1 instead of function FX2. These weighted edges may be particularly useful for code suggestion when the sample pool of empty objects is aggregated across multiple code bases, thereby increasing the sample size, allowing for greater inferences resulting in better recognition and comparisons of commonality among control flow calls.

Similarly, the knowledge graph can also use this pattern recognition to aid in code refactoring. For example, software implementing the knowledge graph may suggest code substitutes for parts of the present user code, based on inferences drawn from relationships between nodes and accompanying weighted edges, and how often nodes appear in the knowledge graph 402.

Another benefit to using the knowledge graph 402 over traditional program analysis is improved scalability. Building the knowledge graph 402 from empty objects allows for the analysis of APIs across large bodies of code (e.g. multiple code modules retrieved from one or more code repositories), since the empty objects do not contain any actual source code to analyze. Hence, the knowledge graph may be used to recognize patterns in how APIs are used at the function level without having to understand the semantics of how the APIs are implemented in the underlying code. Forgoing resource intensive code analysis greatly increases the number and size of code bases that can be analyzed. A more expansive base of analyzed code may result in greater pattern recognition, thereby improving code suggestions and substitutions. Likewise, this pattern recognition may be used to identify bad coding patterns, which may be brought to the attention of the user.

In some embodiments, the knowledge graph 402 can be extended to include information from multiple sources, in addition to information from the empty objects and code statements in the user code. In one such embodiment, the knowledge graph 402 includes code documentation data for functions, objects, and classes referenced in the user code. For example, the code documentation data can include information on function parameters, or return data, derived from comments embedded in the user code or imported modules using natural language processing, or targeted search queries.

In at least one embodiment, the code documentation data can be derived from usage documentation for one or more code modules. For example, usage documentation for a code module can be an external text file associated with the code module, or another type of file that includes an explanation of one or more aspects of the code module. The code documentation data can include information derive from the usage documentation, such as an explanation of the background, purpose, use cases, functionality, benefits, detriments, and the like, of the code module. In at least one embodiment, the usage documentation is retrieved by gathering markdown or restructured files in one or more code repository, using an inverted text index (such that any search results automatically capture the scope of a given code module), and issuing Boolean queries with a combination of (a) module and class, or (b) class and method or (c) function and module as searches.

The knowledge graph 402 can also be extended to include information from internet forums or other question/answer sources. In some embodiments, questions and corresponding answers in one or more message posts on an internet forum can be parsed for code data. The code data can be qualified using a ranking system native to the internet forum. For example, an internet forum can include a message post posing a question. Corresponding answers can be posted in one or more response message posts. The response message posts can be rated using a voting system correlating votes from participants in the forum based on the accuracy, relevance, or usefulness of the corresponding answers. Hence, if a response post contains many positive votes (e.g., above a predefined threshold), the answer in the response post can be qualified as containing useful code data, which can be incorporated into the knowledge graph 402.

In at least one embodiment, posts from internet forums are stored in a searchable index. Then for each function, class, and method, the index can be searched to retrieve the most relevant posts. The most relevant posts can then be incorporated into the node corresponding to the respective function, class, or method in the knowledge graph. In some embodiments, due to difficulties in extracting information from a specific code module via an internet forum, the searches can be performed using Boolean queries for (a) module and class, or (b) module, class and method, or (c) module and function.

The knowledge graph 402 can also be extended to include code analysis based on class hierarchies in one or more code modules. In some embodiments, class hierarchies are extracted from code modules in code repositories using an AST representation of the code modules. The class hierarchies can then be mapped to nodes in the knowledge graph 402, or can be used to qualify data in the knowledge graph 402.

Figure 5:
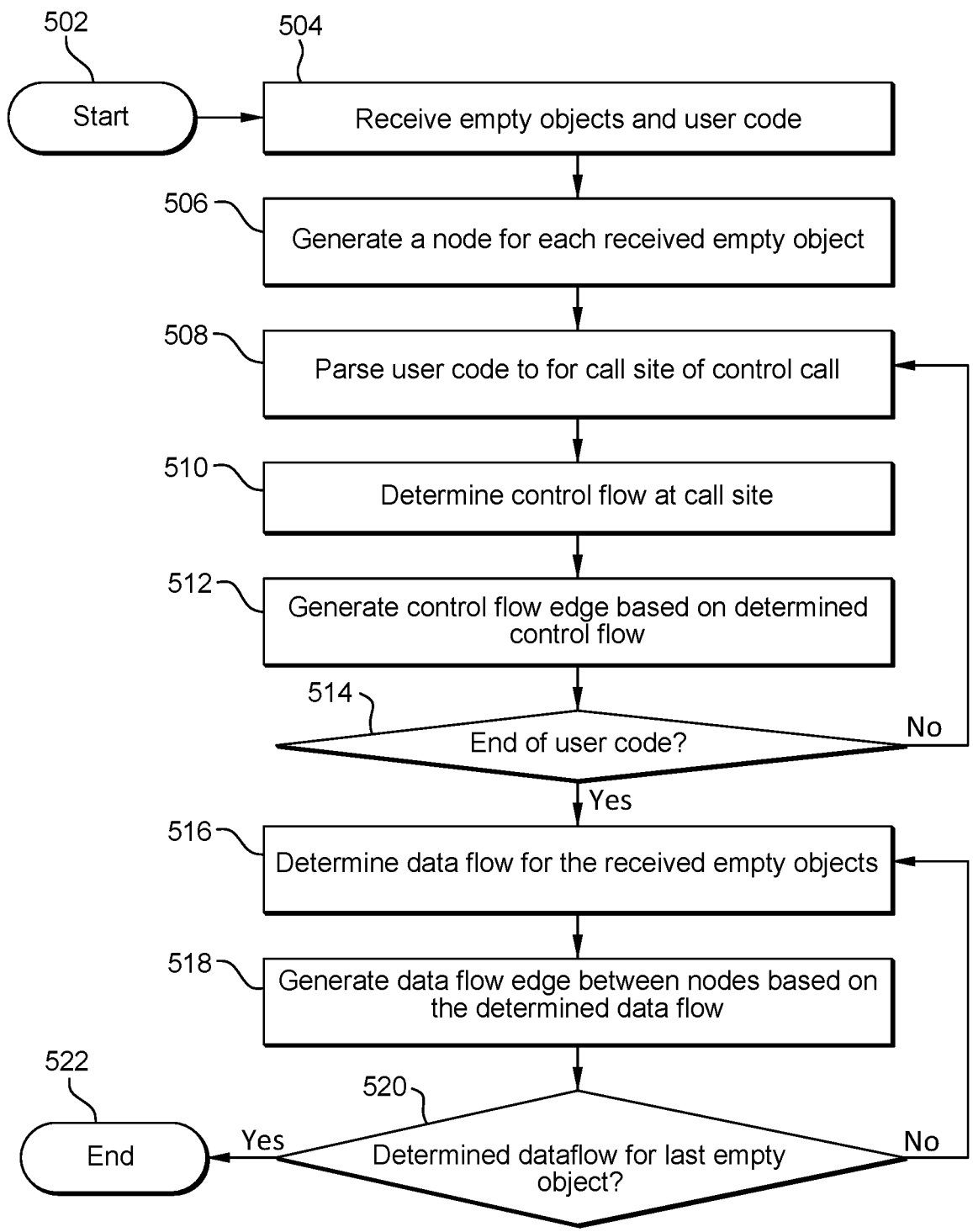
FIG. 5 illustrates a flowchart of a method for creating a knowledge graph, according to one embodiment.

FIG. 5 illustrates a flowchart of a method 500 for creating a knowledge graph, according to one embodiment. The method begins at block 502. At block 504, a knowledge graph creator receives empty objects and user code, or a representation of user code (herein referenced interchangeably as "user code"). At block 506, the knowledge graph creator generates a node for each of the received empty objects.

At block 508 the knowledge graph creator parses the user code for a call site of a control call. At block 510, the knowledge graph creator determines a control flow at the call site. At block 512, the knowledge graph creator generates a control flow edge between at least two of the nodes based on the determined control flow at the call site. In some embodiments, the control flow, and thus the control flow edge, indicates the order of execution for control calls in the user code.

At block 514, if the knowledge graph creator has not reached the end of the user code, then the knowledge graph creator proceeds to block 508. At block 508, the knowledge graph creator again parses the user code to identify another call site.

Returning to block 514, if the knowledge graph creator has reached the end of the user code, then the knowledge graph creator proceeds to block 516. At block 516, knowledge graph creator determines a data flow for the received empty objects. In some embodiments, the data flow indicates data flow through control calls of the user code. For example, the data flow can indicate data values of variables, or object properties, as they are accessed or changed during a function call.

At block 518, in the illustrated embodiment, the knowledge graph creator generates a data flow edge between at least two of the nodes based on the data flow analysis. In some embodiments, the knowledge graph creator generates the data flow edge based on an analysis of the user code.

The data flow edge can indicate the data flow relationship between at least two nodes, thereby depicting the data flow relationships between the control calls in the user code. In some embodiments, the data flow edge indicates a data value relationship between at least two nodes. For example, the data flow edge can indicate an argument passed between nodes, or an API method passed to a node for invocation.

At block 520, if the knowledge graph creator has not determined the dataflow for all of the received empty objects, then the knowledge graph creator proceeds to block 516. At block 516, the knowledge graph creator determines the data flow for another received empty object. A corresponding data flow edge is generated at block 518, as described above.

Any two nodes can be connected by multiple data flow edges. In at least one embodiment, the data flow edges are weighted based on the number of occurrences of control calls in the user code. That is, the knowledge graph creator increases the weight of an edge between two nodes as the number of edges in common between the two nodes increases.

Returning to block 520, if knowledge graph creator has determined the data flow for all of the received empty objects, then the method 500 ends at block 522.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments.

Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., a knowledge graph, or knowledge graph components) or related data available in the cloud. For example, one embodiment could execute on a computing system in the cloud, analyze user code, generate empty objects based on the user code, and generate a knowledge graph based on the empty objects. In one embodiment, the knowledge graph could be stored at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method comprising:
receiving user code;
identifying an import statement in the user code to import an application programming interface (API);
generating a first empty object representing the API based on the import statement;
naming the first empty object to match a name of an import reference included in the import statement;
identifying a first control call in the user code;
determining an invocation of the first control call on the first empty object;
generating a second empty object based on the invocation of the first control call;
naming the second empty object based on a name of the first empty object and a name of the first control call; and
generating a knowledge graph based at least in part on the first empty object and the second empty object to indicate relationships and patterns in usage of a plurality of APIs.

2. The method of claim 1, wherein the first control call is a function call or a method call.

3. The method of claim 1, wherein the first empty object and the second empty object do not include any code statement.

4. The method of claim 1, further comprising:
identifying an argument passed as a parameter in a second control call;
resolving the argument to an existing empty object;
determining an invocation of a third control call on the existing empty object;
generating a third empty object based on the invocation of the third control call; and
naming the third empty object based on a name of the existing empty object and a name of the third control call.

5. The method of claim 4, wherein the third control call is a function call or method call, and wherein the existing empty object and the third empty object do not include any code statement.

6. The method of claim 1, wherein the knowledge graph includes code data from at least one of: (i) a code comment embedded in the user code, (ii) a code comment embedded in a first code module referenced by the import statement, (iii) a code usage document external to the user code, (iv) an internet forum, (iv) a class hierarchy depicted in a second code module.

7. A non-transitory computer-readable medium containing computer program code that, when executed on one or more computer processors, performs an operation configured to:
receive user code;
identify an import statement in the user code to import an application programming interface (API);
generate a first empty object representing the API based on the import statement;
name the first empty object to match a name of an import reference included in the import statement;
identify a first control call in the user code;
determine an invocation of the first control call on the first empty object;
generate a second empty object based on the invocation of the first control call; and
name the second empty object based on a name of the first empty object and a name of the first control call; and
generate a knowledge graph based at least in part on the first empty object and the second empty object to indicate relationships and patterns in usage of a plurality of APIs.

8. The non-transitory computer-readable medium of claim 7, wherein the first control call is a function call or a method call.

9. The non-transitory computer-readable medium of claim 7, wherein the first empty object and the second empty object do not include any code statement.

10. The non-transitory computer-readable medium of claim 7, the operation further configured to:
identify an argument passed as a parameter in a second control call;
resolve the argument to an existing empty object;
determine an invocation of a third control call on the existing empty object;
generate a third empty object based on the invocation of the third control call; and
name the third empty object based on a name of the existing empty object and a name of the third control call.

11. The non-transitory computer-readable medium of claim 10, wherein the third control call is a function call or method call, and wherein the existing empty object and the third empty object do not include any code statement.

12. The non-transitory computer-readable medium of claim 7, wherein the knowledge graph includes code data from at least one of: (i) a code comment embedded in the user code, (ii) a code comment embedded in a first code module referenced by the import statement, (iii) a code usage document external to the user code, (iv) an internet forum, (iv) a class hierarchy depicted in a second code module.

13. A system comprising:
a processor; and
memory, the memory including computer program code that, when executed by the processor, performs an operation, the operation comprising:
   receiving user code;
   identifying an import statement in the user code to import an application programming interface (API);
   generating a first empty object representing the API based on the import statement;
   naming the first empty object to match a name of an import reference included in the import statement;
   identifying a first control call in the user code;
   determining an invocation of the first control call on the first empty object;
   generating a second empty object based on the invocation of the first control call; and
   naming the second empty object based on a name of the first empty object and a name of the first control call; and
   generating a knowledge graph based at least in part on the first empty object and the second empty object to indicate relationships and patterns in usage of a plurality of APIs.

14. The system of claim 13, wherein the first control call is a function call or a method call.

15. The system of claim 13, wherein the first empty object and the second empty object do not include any code statement.

16. The system of claim 13, the operation further comprising:
   identifying an argument passed as a parameter in a second control call;
   resolving the argument to an existing empty object;
   determining an invocation of a third control call on the existing empty object;
   generating a third empty object based on the invocation of the third control call; and
   naming the third empty object based on a name of the existing empty object and a name of the third control call.

17. The system of claim 16, wherein the third control call is a function call or method call, and wherein the existing empty object and the third empty object do not include any code statement.

18. The system of claim 13, wherein the knowledge graph includes code data from at least one of: (i) a code comment embedded in the user code, (ii) a code comment embedded in a first code module referenced by the import statement, (iii) a code usage document external to the user code, (iv) an internet forum, (iv) a class hierarchy depicted in a second code module.

* * * * *